United States Patent
Kim et al.

(10) Patent No.: US 9,453,118 B2
(45) Date of Patent: Sep. 27, 2016

(54) HYBRID POLYMER COMPOSITE FIBER INCLUDING GRAPHENE AND CARBON NANOTUBE, AND METHOD FOR MANUFACTURING SAME

(75) Inventors: Seon Jeong Kim, Seoul (KR); Min Kyoon Shin, Seoul (KR); Shi Hyeong Kim, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 212 days.

(21) Appl. No.: 14/005,407

(22) PCT Filed: Mar. 9, 2012

(86) PCT No.: PCT/KR2012/001719
§ 371 (c)(1),
(2), (4) Date: Sep. 16, 2013

(87) PCT Pub. No.: WO2012/124935
PCT Pub. Date: Sep. 20, 2012

(65) Prior Publication Data
US 2014/0001417 A1    Jan. 2, 2014

(30) Foreign Application Priority Data
Mar. 15, 2011  (KR) .................. 10-2011-0022834

(51) Int. Cl.
*H01B 1/06* (2006.01)
*H01B 1/24* (2006.01)
(Continued)

(52) U.S. Cl.
CPC .................. *C08K 7/06* (2013.01); *B82Y 30/00* (2013.01); *C08J 3/2053* (2013.01); *C08J 5/005* (2013.01); *C08K 3/04* (2013.01); *C08K 5/09* (2013.01);
(Continued)

(58) Field of Classification Search
CPC ........... D01D 1/00; D01D 5/38; C08J 5/005; C08J 5/04; H01B 1/24
USPC ................ 252/511; 524/157, 284; 174/126.1
See application file for complete search history.

(56) References Cited

U.S. PATENT DOCUMENTS

2007/0284557 A1    12/2007   Gruner et al.
2008/0020193 A1    1/2008    Jang et al.
(Continued)

FOREIGN PATENT DOCUMENTS

KR    20100105179 A    9/2010
KR    20100108868 A    10/2010

OTHER PUBLICATIONS

International Search Report mailed Oct. 31, 2012; PCT/KR2012/001719.
(Continued)

*Primary Examiner* — Khanh Tuan Nguyen
(74) *Attorney, Agent, or Firm* — Ladas & Parry LLP

(57) ABSTRACT

The present invention relates to a graphene-based hybrid polymer composite fiber and a method for manufacturing same, and more particularly, to a hybrid composite fiber including the graphene, a carbon nanotube, and a polymer, wherein the graphene and the carbon nanotube are combined by means of self-organization through hydrogen bonding, so as to be very tough and flexible, without involving stretching, and to a method for manufacturing the hybrid composite fiber.

22 Claims, 8 Drawing Sheets

(51) Int. Cl.
  *C08K 7/06* (2006.01)
  *D01D 1/02* (2006.01)
  *D01D 5/06* (2006.01)
  *D01F 1/09* (2006.01)
  *D01F 1/10* (2006.01)
  *C08J 5/00* (2006.01)
  *C08K 3/04* (2006.01)
  *C08K 5/09* (2006.01)
  *C08K 5/42* (2006.01)
  *B82Y 30/00* (2011.01)
  *C08J 3/205* (2006.01)
  *C08K 7/24* (2006.01)
  *D01F 6/14* (2006.01)
  *D01F 6/16* (2006.01)

(52) U.S. Cl.
  CPC . *C08K 5/42* (2013.01); *C08K 7/24* (2013.01); *D01D 1/02* (2013.01); *D01D 5/06* (2013.01); *D01F 1/09* (2013.01); *D01F 1/10* (2013.01); *C08J 2329/04* (2013.01); *C08J 2333/12* (2013.01); *C08K 2201/011* (2013.01); *D01F 6/14* (2013.01); *D01F 6/16* (2013.01)

(56) References Cited

U.S. PATENT DOCUMENTS

2011/0017957 A1  1/2011  Gaillard et al.
2011/0024158 A1* 2/2011  Tsotsis ............... H01B 1/24
                                        174/126.1

OTHER PUBLICATIONS

Dan Li, et al; "Processable aqueous dispersions of graphene nanosheets", Nature Nanotechnology, vol. 3, Feb. 2008, pp. 101-105.

Yuanqing Li, et al; "Synergistic effect of hybrid carbon narilube-graphene mechanical properties of PVA composites", Journal of Materials Chemistry, First published online Jun. 21, 2011; pp. 10844-10851, vol. 21.

Vincent C Tung, et al; "Low-Temperature Solution Processing of High-Performance Transparent Conductors", Nano Letters, vol. 9, No. 5, pp. 1949-1955; Published on Web: Apr. 10, 2009.

Chunxia Wu, et al; "Graphene and carbon nanofiber nanopaper for multifunction composite materials", Date Published Apr. 28, 2011, 8 pages; Proc. SPIE 7978, Behavior and Mechanics of Multifunctional Materials and Composites 2011.

* cited by examiner

HYBRID POLYMER COMPOSITE FIBER INCLUDING GRAPHENE AND CARBON NANOTUBE, AND METHOD FOR MANUFACTURING SAME

TECHNICAL FIELD

The present invention relates to a hybrid polymer composite fiber including graphene and carbon nanotubes, and a method for producing the same. More specifically, the present invention relates to a flexible hybrid polymer composite fiber with improved toughness including graphene and carbon nanotubes, and a method for producing the hybrid polymer composite fiber.

BACKGROUND ART

Strong, lightweight textile fibers are of high interest in various applications such as reinforcing materials of polymer composites or materials for flak jackets. Highly electrically conductive fibers can be used as multifunctional fibers that act as electrodes for supercapacitors, sensors, batteries or actuators while serving as mechanical supports. Such characteristics can be expected from porous structures having a large surface area. In this case, however, loss of mechanical strength is inevitable. Thus, the use of fibers made of only composite materials has received attention as an approach to increase the toughness of reinforcing fibers. Polymers including carbon nanotubes (CNTs) produced by wet spinning are known to have higher toughness than other materials, even cobwebs.

Such high toughness is determined by the ability to align the carbon nanotubes (CNTs) in the fiber direction to maximize the interaction between the carbon nanotubes (CNTs) and the polymers. One reason for limited alignment of the carbon nanotubes (CNTs) is that the carbon nanotubes (CNTs) form aggregates by cross-linking during wet spinning despite the use of dispersants such as surfactants.

Improvements of alignment characteristics and toughness through hot or cold drawing after fiber spinning have been reported to date, but little is known about a method for producing a composite fiber with high toughness by simple binding of constituent materials without involving complicated drawing.

Recent studies on graphene flake (GF) composites suggest the possibility of producing fibers with high strength and toughness. Graphene flakes (GFs) are more advantageous as nanofillers for reinforcement than rod-like carbon nanotubes (CNTs) and increase the stiffness and axial tensile strength of fibers. Graphene plates are known to have an uneven wrinkled surface, contributing to an increase in load transfer through interaction with surrounding matrix materials. The planar structure of GFs increases the contact area with matrix materials compared to rod-like carbon nanotubes (CNTs) having a similar length. The 2-dimensional structure of graphene flakes (GFs) is useful because microcracks may be effectively deflected, tilted, or twisted.

However, despite the need to develop composite fibers using graphene and carbon nanotubes with high strength and toughness, effective fiber production methods have not been proposed so far.

DISCLOSURE

Technical Problem

It is an object of the present invention to provide a flexible composite fiber that is produced through self-alignment by hydrogen bonding between graphene flakes and carbon nanotubes without the need for drawing, achieving high toughness and flexibility, and a method for producing the composite fiber.

Technical Solution

According to an aspect of the present invention, there is provided a hybrid polymer composite fiber including graphene and carbon nanotubes wherein the graphene and the carbon nanotubes are self-aligned through hydrogen bonding.

In one embodiment of the present invention, the graphene are preferably bonded to the carbon nanotubes in a weight ratio of 9:1 to 1:10, more preferably 1:1. Outside this range, the mechanical and electrical properties of the hybrid polymer composite fiber are not significantly improved compared to graphene composite fibers and carbon nanotube composite fibers, and it is thus difficult to expect improved physical properties resulting from hybridization.

In one embodiment of the present invention, the graphene may be, for example, graphene oxide or chemically reduced graphene having acid functional groups on the surface thereof. The use of reduced graphene with carboxyl groups (—COOH) is more preferred. The graphene is preferably 100 to 1000 nm in length. The graphene is generally produced by a chemical exfoliation method, which is advantageous in mass production and is thus competitive in terms of cost. In this case, the graphene has a size of 100 to 1000 nm.

In one embodiment of the present invention, the carbon nanotubes are preferably single-walled carbon nanotubes with excellent electrical conductivity and mechanical properties, and are preferably bonded to a surfactant with a hydrophilic sulfonic acid group (SO3-). Examples of usable surfactants include sodium dodecyl benzene sulfonate (SDBS), sodium dodecyl sulfonate (SDS), 4- (1,1,3,3-Tetramethylbutyl)phenyl-polyethylene glycol (Triton X-100), and cetyltrimethylammonium bromide (CTAB).

In one embodiment of the present invention, the hydrogen bonds are formed between the carboxyl groups (—COOH) of the graphene and the sulfonic acid group ($SO_3^-$) of the surfactant bonded to the carbon nanotubes.

In one embodiment of the present invention, the polymer may be selected from polyvinyl alcohol (PVA) and poly (methyl methacrylate) (PMMA). The content of the polymer may be adjusted to 20 to 80% by weight depending on the molecular weight and coagulation time of the polymer. If the weight proportion of the polymer is outside the range defined above, the toughness and the mechanical strength of the polymer composite fiber may be drastically decreased.

The hybrid polymer composite fiber of the present invention can be formed into knot, self-twisted, rubber band or spiral spring structures due to flexibility thereof.

In one embodiment of the present invention, the hybrid polymer composite fiber has a toughness of about 480 to about 970 J/g, a spring constant of about 2 to about 50 GPa, and an electrical conductivity of about 0.01 to about 100 S/cm.

The present invention also provides a method for producing a hybrid polymer composite fiber, including a) dispersing chemically reduced graphene and a surfactant in a solvent to prepare a dispersion, b) adding a dispersion of carbon nanotubes to the dispersion of the graphene and the surfactant, and c) feeding a polymer to the mixed dispersion to produce a fiber.

In one embodiment of the present invention, the chemically reduced graphene may be prepared by reducing an aqueous dispersion of graphene with hydrazine at 90 to 100° C. for 1 to 24 hours.

In one embodiment of the present invention, the method may further include washing and drying the fiber obtained in c), followed by dipping in alcohol to improve the degree of crystallization of the fiber.

Advantageous Effects

The method of the present invention has the advantage that an appropriate ratio between graphene flakes (GFs) and single-walled carbon nanotube (SWNT) particles leads to unique self-alignment thereof, thus eliminating the need for drawing. The degree of alignment is closely associated with toughness. The hybrid polymer composite fiber of the present invention has higher toughness than single-walled carbon nanotubes/polyvinyl alcohol (SWNT/PVA) fibers simply produced by wet spinning, cobwebs, or Kevlar fibers. The high-toughness hybrid fiber can be applied to high-performance artificial muscles, strain sensors, smart fibers, and wearable devices. In addition, the hybridization method based on binding interaction between different kinds of carbon nanomaterials can be used to manufacture various composite materials, including films as well as fibers.

DESCRIPTION OF DRAWINGS

FIG. 1a shows the procedure for producing aligned hybrid nanomaterials composed of GFs and SWNT bundles by sonication and wet spinning; FIG. 1b is a TEM image showing the bonding between SWNTs and GF at the edges of GF (the arrows indicate the SWNT bundles); and FIG. 1c is a schematic diagram showing a hybridized form of GF and SWNTs by hydrogen bonding between COOH of the GF and $SO_3^-$ of SDBS bonded to the SWNTs (the arrows indicate SWNTs hybridized with GF at an edge of the GF).

FIG. 2a shows stress-strain curves of (A) hybrid, (B) GF/PVA, (C) SWNT/PVA, (D) C1:G9/PVA, and (E) C10:G1/PVA fibers; FIGS. 2b, 2c, and 2d show the modulus of elasticity, mechanical strength, and toughness of the hybrid fiber and other fibers ((1) a hot-drawn SWNT/PVA fiber, (2) a cold-drawn SWNT/PVA fiber, (3) cobwebs, and (4) a Kevlar fiber), respectively; FIG. 2e shows Raman spectra of carbon nanomaterials incorporated into the hybrid (A), SWNT/PVA (C), and GF/PVA fibers (B); and FIG. 2f shows the ratios of Raman intensities measured in the axial directions of the hybrid SWNT/PVA and GF/PVA fibers and in the directions perpendicular to the axial directions.

FIG. 3a shows good alignment of GF/SWNT hybrid nanomaterials in a fiber produced by wet spinning; FIG. 3b is a high magnification image showing GF/SWNT hybrid nanomaterials interconnected by PVA chains; FIG. 3c shows a layer structure of a hybrid fiber produced by wet spinning without using a polymer; FIG. 3d shows a hybrid fiber twisted using an electric motor (its twisted angle can be seen from the inset); FIG. 3e is a hybrid fiber in the form of a rubber band; and FIG. 3f is a hybrid fiber in the form of a spring after annealing.

MODE FOR INVENTION

The present invention will now be described in more detail with reference to exemplary embodiments thereof.

Carbon nanotubes (CNTs) and graphene flakes (GFs) are carbon nanomaterials that have excellent mechanical properties and high surface-to-volume ratios. Such carbon nanomaterials can be used for the manufacture of polymer nanocomposites with high stiffness, strength, and optionally toughness. In the method of the present invention, wet spinning is used to produce a graphene flakes (GFs)-carbon nanotubes (CNTs)/polymer fiber in an easy manner.

The hybrid fiber of the present invention has an electrical conductivity of a maximum of 50 Scm. In addition, the hybrid fiber of the present invention has toughness values of 10 times or more and 100 times or more higher than those of composite fibers including carbon nanotubes (CNTs) only and composite fibers including graphene flakes (GFs) only, respectively. Such an increased toughness is because the carbon nanomaterials are effectively dispersed and self-aligned through a single spinning process even without mechanical drawing and annealing commonly used in conventional methods.

If the carbon nanomaterials are present in large amounts in the composite fiber of the present invention, dispersion and alignment of the carbon nanomaterials are limited, and as a result, effective load transfer is limited and satisfactory mechanical properties are not obtained. In the present invention, it has been found that the carbon nanotubes (CNTs) and the chemically modified graphene flakes (GB) can be effectively aligned in the fiber axial direction through interaction therebetween during spinning.

Such good alignment effect is not obtained when carbon nanotubes (CNTs) or graphene flakes (GFs) were used alone. Optimization of the ratio between the graphene flakes (GFs) and the carbon nanotubes (CNTs) produces synergistic effects on mechanical properties. The hybrid fiber can be integrally sewn on a rubber band and can be manufactured in the form of a spiral spring having a high spring constant due to high toughness and flexibility thereof.

Figure 1:
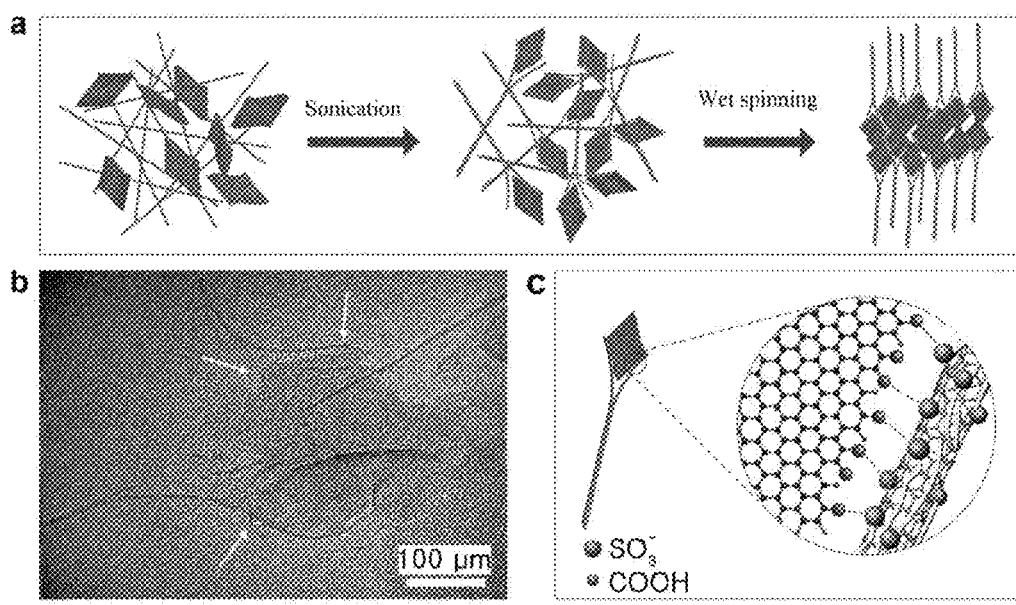
FIG. 1 shows the hybridization procedure of GFs and SWNTs.

FIG. 1 shows the procedure for producing the hybrid composite fiber of the present invention. In the present invention, sodium dodecyl benzene sulfonate (SDBS) was used to effectively disperse graphene flakes (GFs) and single-walled carbon nanotubes (SWNTs).

Figure 4:
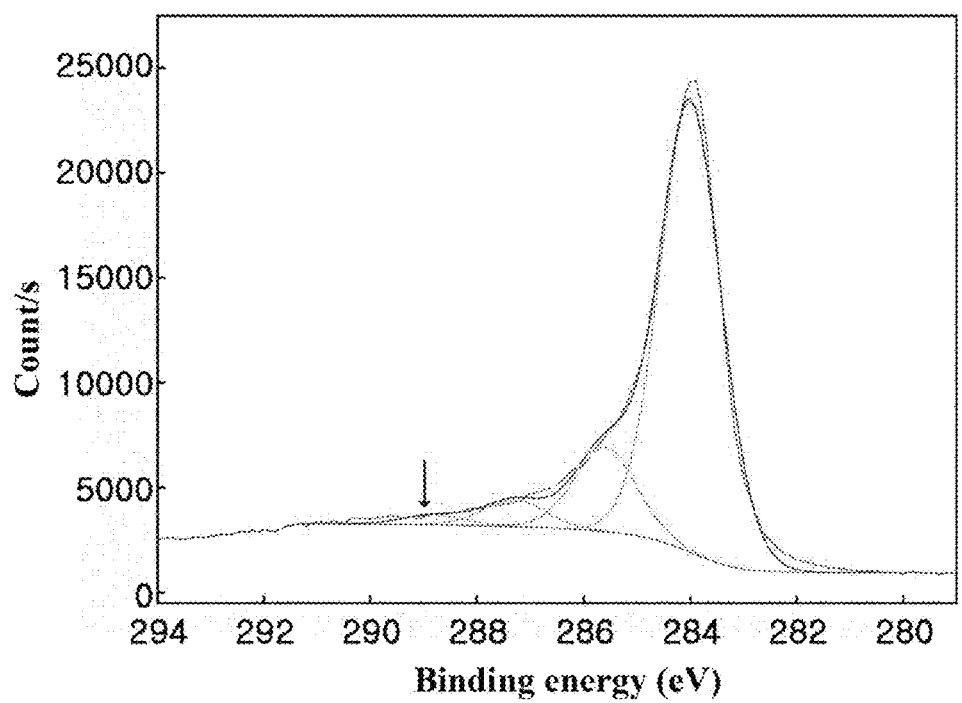
FIG. 4 shows binding energy data resulting from carboxylate (O—C=O). Binding energy values appeared at 287.3 eV and 288.0 eV due to the presence of carboxylate (O—C=O).

First, the fiber of the present invention was diluted and dried to obtain a dispersion. Transmission electron microscopy of the dispersion shows that the individual nanostructures were assembled due to the unique interaction therebetween, as shown in FIG. 1b. The chemically modified graphene flakes (GFs) used in the present invention had functional groups such as carboxyl groups (–COOH) (FIG. 4). It is thought that the single-walled carbon nanotubes (SWNTs) were attached to the edges of the graphene flakes (GFs).

The single-walled carbon nanotubes (SWNTs) preferentially interact with the edges of the graphene flakes (GFs) through hydrogen bonding (pH=7) between the hydrophilic sulfonic acid groups ($SO_3^-$) of sodium dodecyl benzene sulfonate (SDBS) bonded to the single-walled carbon nanotubes (SWNTs) and the carboxyl groups (—COOH) of the graphene flakes (GFs) (FIG. 1c). XPS analysis results reveal that the proportion of carbon atoms relative to oxygen atoms in the graphene flakes (GFs) was 11.1%, which was higher than that (5.3%) in the single-walled carbon nanotubes (SWNTs).

The GF/SWNT dispersion was fed to an aqueous solution of polyvinyl alcohol (PVA) and was allowed to aggregate to form the GF/SWNT/PVA hybrid composite fiber. Then, the hybrid composite fiber was washed, dipped in methanol, and dried to obtain the robust composite fiber consisting of the GFs and SWNTs. The ratio of the graphene flakes (GFs) to the single-walled carbon nanotubes (SWNTs) in the hybrid composite fiber can be readily controlled by varying the volumes of the respective dispersions of the nanoparticles used in the preparation of the spinning solution.

Figure 3:
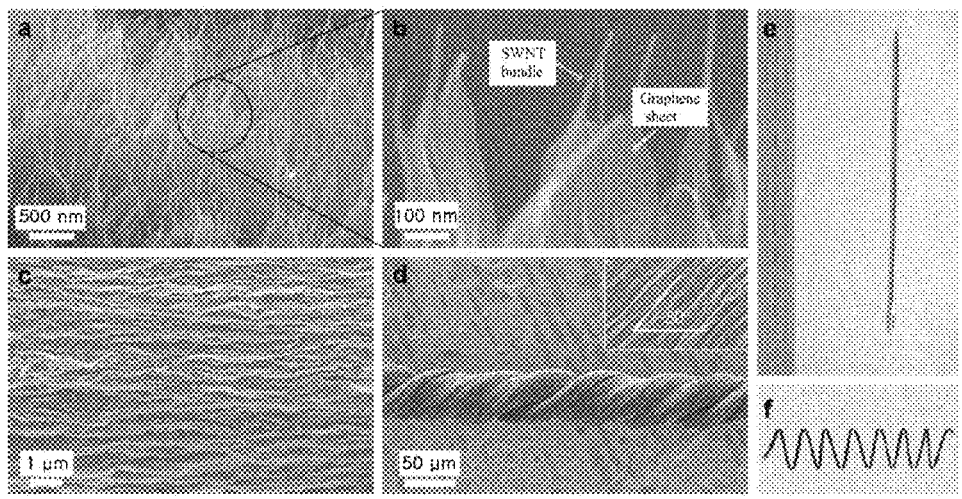
FIG. 3 shows microscopic/macroscopic images of flexible hybrid fibers with high toughness.

A hybrid fiber containing no polymer could be produced by feeding 37% hydrochloric acid as a coagulant instead of PVA (FIG. 3c). A surface image of the hybrid fiber containing no polymer confirms that a hybrid structure consisting of graphene flakes (GFs) and single-walled carbon nanotubes (SWNTs) was assembled to form a layer structure in the course of producing the hybrid fiber.

The present invention will be explained in detail with reference to the following examples. However, these examples are provided to assist in further understanding of the invention and are not to be construed as limiting the scope of the invention.

EXAMPLE 1

Preparation of Solution of Chemically Modified Reduced Graphene (RCCG)

Figure 9:
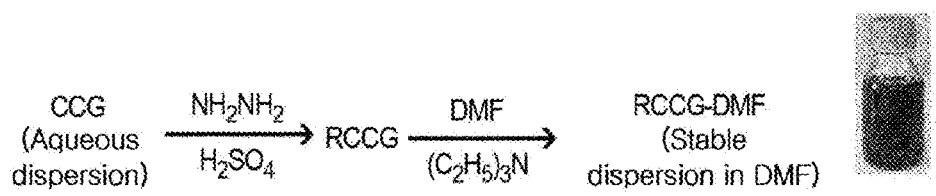
FIG. 9 shows a process for preparing a solution of graphene flakes (GFs) in DMF and a photograph of the GF/DMF solution.
Figure 10:
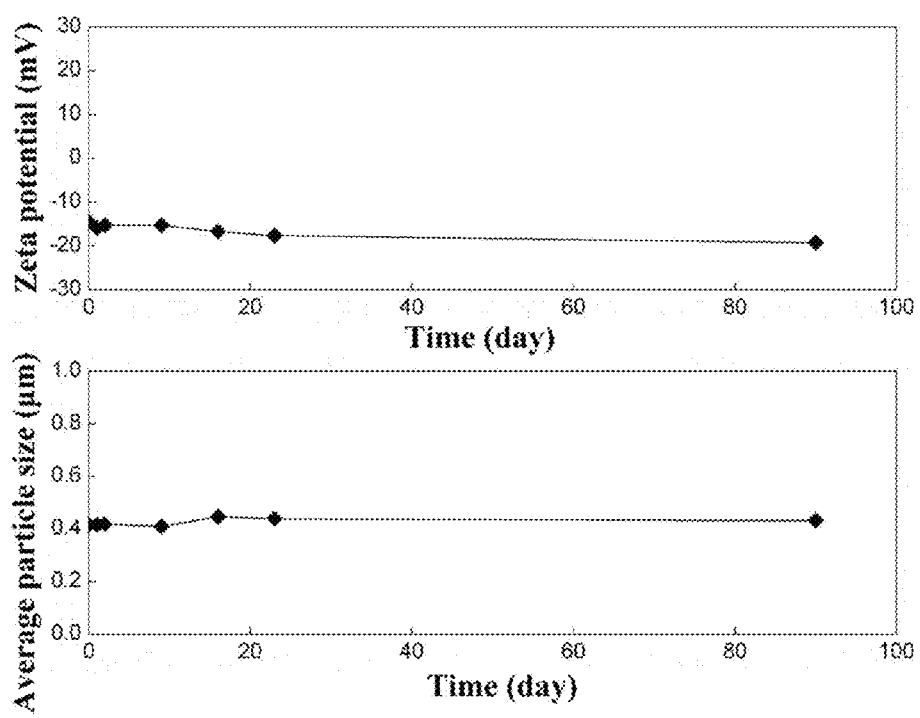
FIG. 10 shows the particle size and zeta potential of graphene flakes (GFs) dispersed in DMF.

In accordance with the method shown in FIG. 9, RCCG was dispersed in dimethylformamide (DMF) in the presence of an appropriate amount of triethylamine to obtain a stable graphene dispersion. Several grams of RCCG was obtained by reducing an aqueous dispersion of CCG with excess hydrazine at 95° C. over 2 h in accordance with previously reported methods (Li, D., Muller, M. B., Gilje, S., Kaner, R. B. & Wallace, G. G. Processable aqueous dispersions of graphene nanosheets. *Nature Nanotech.* 3, 101 (2008)). As a result of the reduction reaction, the graphene aggregated in the aqueous solution. The aggregated graphene particles were acidified with dilute sulfuric acid under vigorous stirring to a pH of 2 or less, and transferred to a funnel. The aggregates were washed with a large amount of Milli-Q water on the funnel until the pH reached about 7. The filtered material was dried under vacuum at 70° C. for 48 h to obtain RCCG as a solid. The dried RCCG powder was dissolved in DMF to prepare a 0.47-0.5 mg/mL RCCG/DMF solution. The size of the graphene thin film was about 400 nm, as measured using a Zetasizer. The particle size and zeta potential remained stable for several months (FIG. 11). The dispersion was filtered under vacuum to obtain a paper having a resistance of 30-40 Ω/sq.

EXAMPLE 2

Production of Graphene Flakes/Single-Walled Carbon Nanotubes/Polymer (GF/SWNT/PVA) Fiber For fiber spinning, an aqueous dispersion of GFs and an aqueous dispersion of SWNTs were prepared. In order to convert a GF/DMF dispersion to the aqueous dispersion of GFs, the GFs were collected by centrifugation and the DMF supernatant was discarded. The DMF was replaced by the same volume of water, followed by sonication. This procedure was repeated three times to completely remove the DMF. Subsequently, the GFs were effectively dispersed in the water by sonication using 1 wt % sodium dodecyl benzene sulfonate (SDBS). The resulting GF aqueous dispersion was subjected to sonication using 1 wt % SDBS for 30 min and mixed with the separately prepared SWNT aqueous dispersion. The graphene/SWNT dispersion was slowly injected into a beaker containing PVA (molecular weight=146,000-186,000, degree of hydrolysis=~99%) as a coagulant to produce a continuous, uniform GF/SWNT/PVA hybrid fiber. The fiber was thoroughly washed with DI water, dried at room temperature, and dipped in methanol for 12 h to increase the degree of crystallization of the PVA. A SWNT/PVA fiber was produced in the same manner as described above, except that the SWNT aqueous dispersion and SDBS only were used. A GF/PVA fiber was produced in the same manner as described above, except that the GF aqueous dispersion and SDBS only were used.

COMPARATIVE EXAMPLE 1

Production of Single-Walled Carbon Nanotubes/Polymer (SWNT/PVA) Fiber and Graphene Flakes/Polymer (GF/PVA) Fiber For comparison with the hybrid GF/SWNT/PVA fiber, a single-walled carbon nanotubes/polymer (SWNT/PVA) fiber and a graphene flakes/polymer (GF/PVA) fiber were produced. Specifically, the SWNT/PVA fiber was produced in the same manner as in Example 2, except that the SWNT aqueous dispersion and sodium dodecyl benzene sulfonate (SDBS) only were used. The GF/PVA fiber was produced in the same manner as in Example 2, except that the GF aqueous dispersion and sodium dodecyl benzene sulfonate (SDBS) only were used.

EXPERIMENTAL EXAMPLE

Characterization of the Composite Fibers

Figure 2:
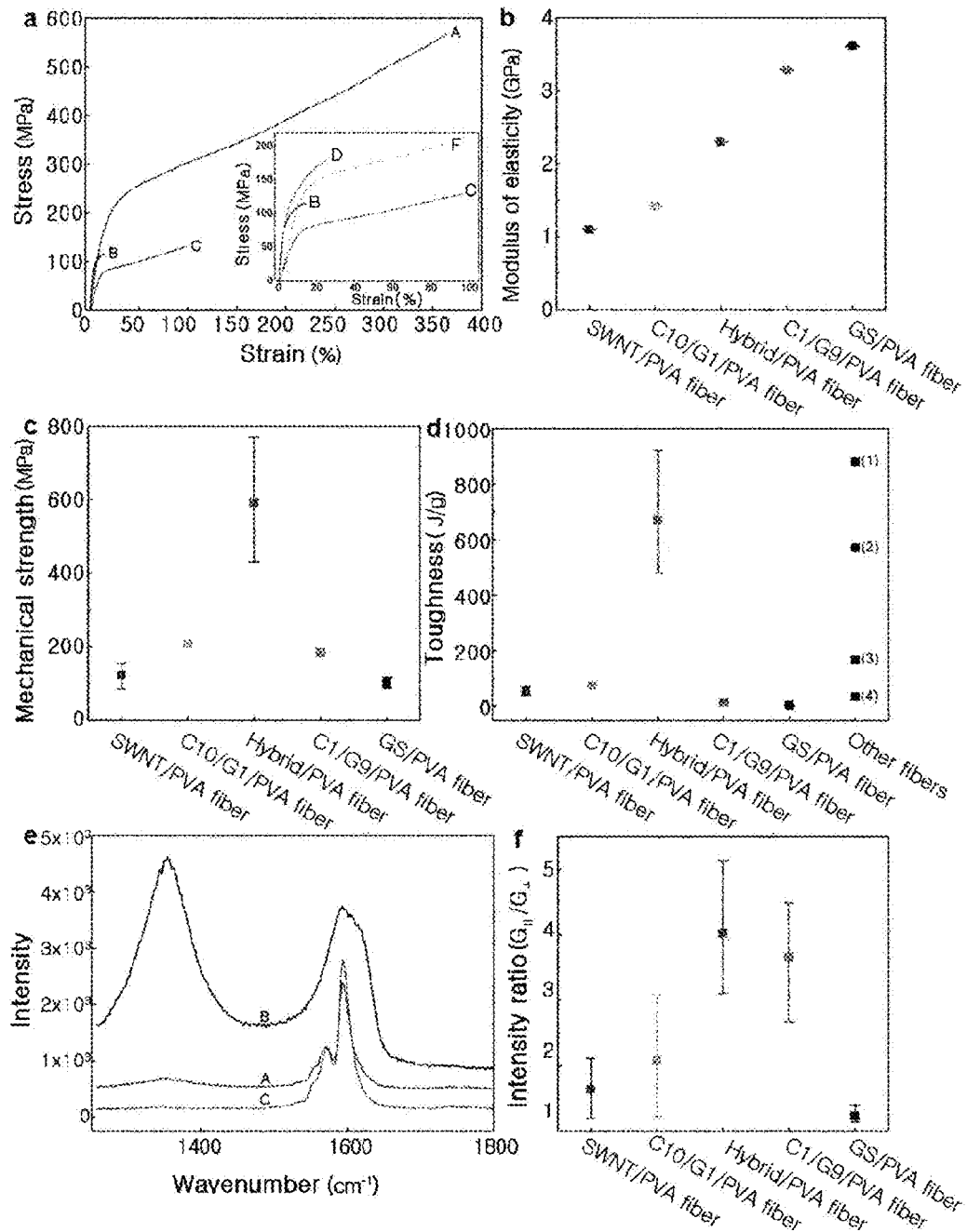
FIG. 2 shows the mechanical properties and Raman spectra of SWNT/PVA and GF/PVA composite fibers.

The mechanical properties of the hybrid GF/SWNT/PVA fiber were evaluated. As a result, surprising synergistic effects were confirmed when the weight ratio of the two kinds of nanoparticles was 1:1. FIG. 2a shows typical stress-strain curves of the hybrid GF/SWNT/PVA fiber, the GF/PVA fiber, and the SWNT/PVA fiber. In each case, the PVA content was 35-40% by weight. The hybrid fiber including GFs and SWNTs in a weight ratio of 1:1 showed markedly increased fracture strength, fracture strain, and yield strength compared to the other hybrid fibers, the SWNT/PVA fiber, and the GF/PVA fiber. The moduli of elasticity of the composites steadily increased with increasing content of GF relative to SWNT (FIG. 2b). The modulus of elasticity of the GF/PVA fiber (3.6 GPa) was 3 times or more higher than that of the SWNT/PVA fiber (1.1 GPa), which demonstrates that the reinforcing effect of GFs is stronger than that of SWNTs with the same weight. The tensile strengths (FIG. 2c) and fracture strains of the unstretched fibers increased at the initial stage and thereafter decreased with increasing GF/SWNT ratio. The hybrid fiber with the same GF and SWNT contents showed a very high strength (567 MPA) and a fracture strain (364%), which were 4 times or more higher than those of the SWNT/PVA and GF/PVA fibers.

Figure 5:
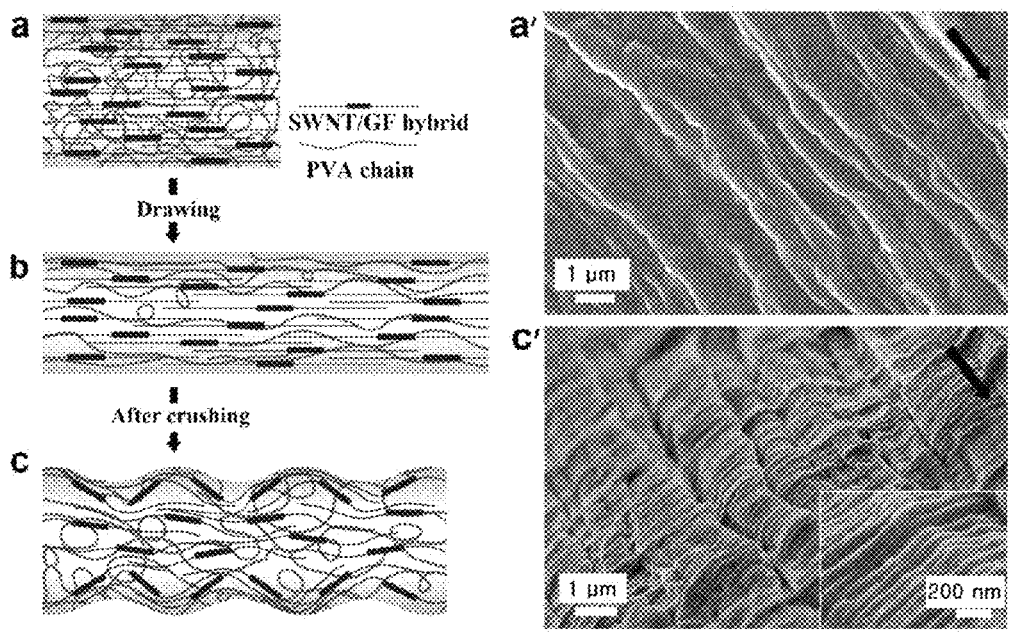
FIG. 5 shows diagrams showing structural changes of a hybrid fiber during tensile strength testing and surface SEM images of the hybrid fiber before drawing (top) and after crushing (bottom) (the arrows indicate the fiber axis).

The high fracture stress and fracture strain of the hybrid fiber also mean high toughness thereof, which can be estimated from the area under the stress-strain curve. The hybrid fiber with the same GF and SWNT contents had an average toughness of 670 J/g, which was about 13-fold and about 130-fold higher than the SWNT/PVA fiber (average 53 J/g) and the GF/PVA fiber (average 5 J/g), respectively. The toughness values of other hybrid fiber samples were measured and are shown in FIG. 2d. The toughness range (480-970 J/g) of the inventive hybrid fiber without having undergone drawing were comparable to or slightly higher than the measured values (570 and 870 J/g) of the high-toughness SWNT/PVA fibers having undergone drawing after wet spinning. Further, the inventive nanocomposite fiber had a higher toughness than other carbon fibers, cobwebs, and Kevlar fibers. The reason for the higher toughness of the inventive GF/SWNT/PVA fiber is due to high energy absorption resulting from plastic deformation after the occurrence of mechanical yield. After tension testing, the formation of regular wrinkles similar to slip bands was observed on the surface of the inventive hybrid composite fiber (FIG. 5). Slip bands are sometimes observed on the surfaces of plastic deformed metals.

Figure 6:
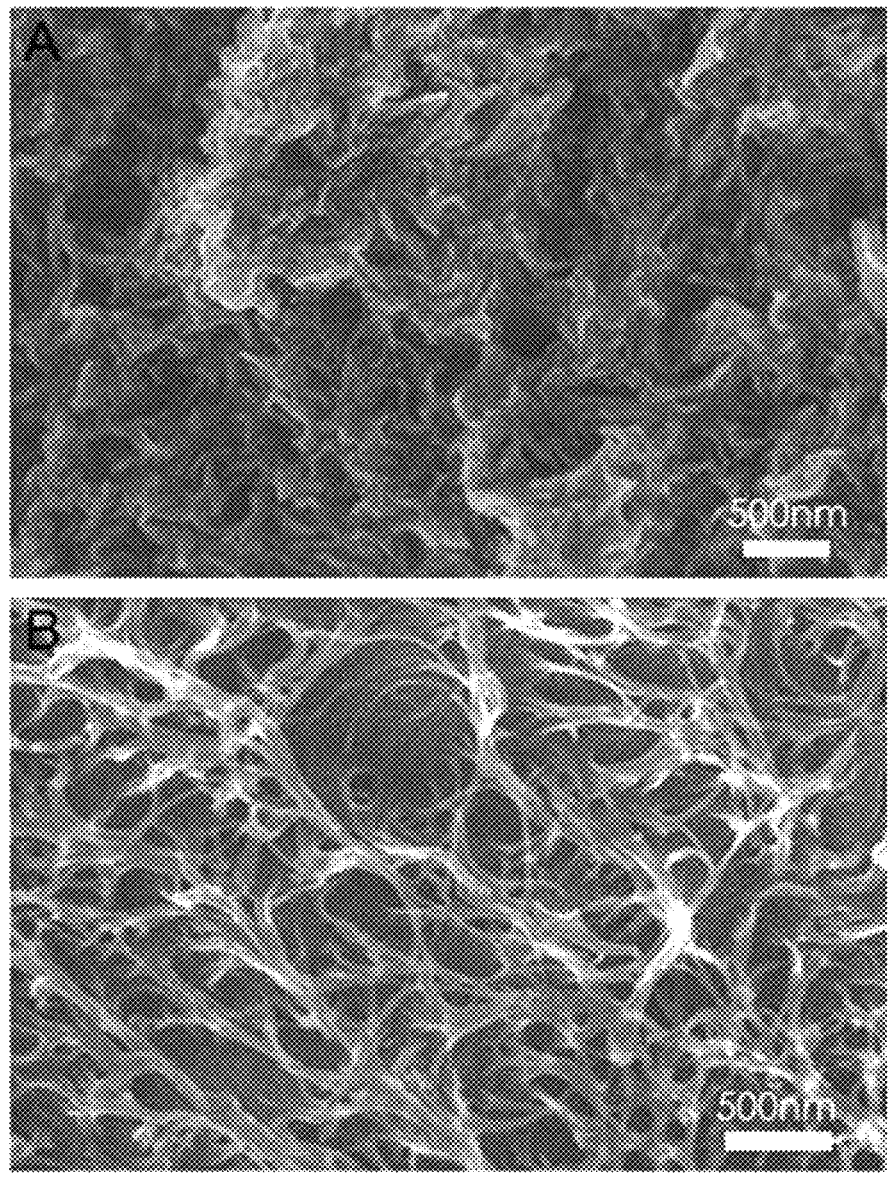
FIG. 6 shows SEM images showing the cross sections of (a) GF/PVA and (b) SWNT/PVA fibers after crushing.

Contrary to conventional research results, the highly aligned nanostructure of graphene flakes/single-walled carbon nanotubes (GF/SWNT) in a PVA fiber could be directly obtained by a wet spinning process in the present invention. According to previous research, highly self-aligned CNTs in PVA were observed only when fibers were drawn in a dry or expanded state after spinning at room temperature or high temperature. The surface of the inventive hybrid fiber including GFs and SWNTs in a ratio of 1:1 was analyzed by scanning electron microscopy (SEM), and as a result, it was confirmed that the SWNTs were highly aligned in the fiber direction although the inventive hybrid fiber had undergone no drawing (FIG. 3a). From a high magnification image (FIG. 3b), it was confirmed that GFs were arranged along the fiber direction of SWNT bundles tightly attached to the edges and surfaces thereof. In contrast, poor alignment states of the GFs or SWNTs were observed at the cut sides of the GF/PVA and SWNT/PVA fibers (FIG. 6). Similarly to this, a previous PVA/CNT fiber having undergone no drawing after spinning had a network structure of entangled CNT bundles without being aligned. The hybrid fiber produced without using PVA had a distinct layer structure similar to a graphene paper produced by vacuum distillation of the dispersion (FIG. 3c).

The structure of the hybrid fiber was investigated in more detail by Raman spectroscopy. The GF/PVA, SWNT/PVA, and hybrid fibers showed different forms of D and G bands, and a combination of GFs and SWNTs was confirmed in the hybrid fiber (FIG. 2e). As can be seen from the polarized Raman spectrum, the hybrid nanomaterials were highly aligned in the fiber (FIG. 2f). Particularly, the ratio of the Raman intensities of the G bands in the fiber axial direction and the direction perpendicular thereto (the ratio of $G_{\|}$ to $G_{\perp}$) was very sensitive to the GF:SWNT ratio in the fiber. This ratio reflects the degree of alignment of the GFs and SWNTs in the fiber direction and shows a distinct increase and decrease with increasing GF content in the composite fiber.

Figure 7:
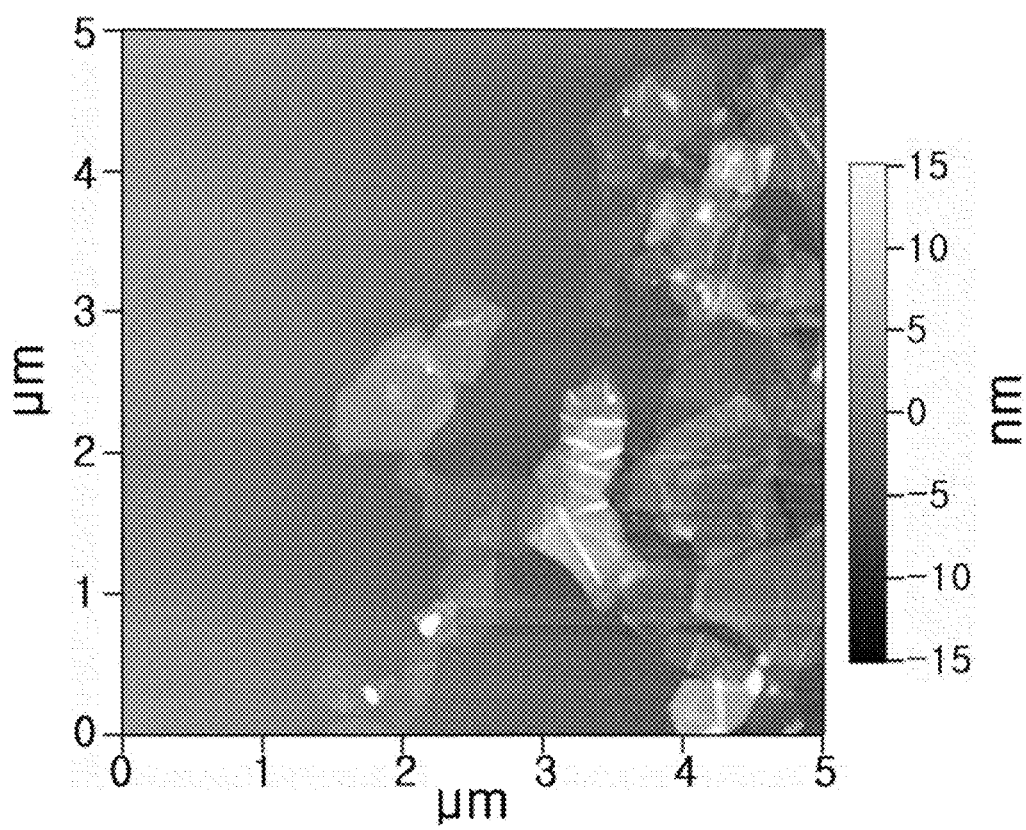
FIG. 7 is an AFM image of graphene flakes (GB) deposited on a silicon (Si) substrate from an aqueous dispersion.

The degree of self-alignment of hybrid fibers with different GF:SWNT ratios are in almost perfect agreement with the measured toughness values. That is, a high-toughness fiber has a high degree of alignment of SWNTs and GFs. In previous research, the same relationship was confirmed when the alignment of SWNTs was induced through a secondary drawing process. In the present invention, it was confirmed that high self-alignment can be induced by the adjustment of the ratio between SWNTs and GFs during wet spinning. The strong interaction between SWNTs and GFs is thought to cause the formation of interconnected network structures easily arranged during fiber spinning and aggregation. Each GF is bonded to several SWNTs to promote alignment during shear flow. If GFs are present in too small an amount, they do not effectively interact with SWNTs and are not easily arranged during fiber spinning and aggregation. Meanwhile, if SWNTs are present in too small an amount, the effect of improving toughness disappears. This is believed to be because cracks are not effectively deflected by the relatively short length of graphene (the average length of graphene used was about 400 nm, FIG. 7).

The hybrid fiber produced in Example 2 was strong and easy to handle. Even when the hybrid fiber was twisted using an electric motor, no fracture was observed. Even when the fiber was twisted at a torsion angle of about 50°, its strain was maintained (FIG. 3d). These results indicate that the hybrid fiber had both flexibility and toughness and was strong sufficiently to be woven into a fabric and to be integrally sewn on a rubber band (FIG. 3e). The rubber band could be reversibly stretched to a maximum of 20%.

FIG. 3f shows shape control characteristics and spring characteristics of the hybrid fiber. The hybrid fiber was wound on a stainless steel tube having a diameter of 1.2 mm and annealed at 150° C. for 1 h to manufacture a spiral spring. The hybrid fiber spring had a spring constant of about 41 N/m (FIG. 8) and showed very high reproducibility under full compression and 100% extension conditions. The spring constant of the hybrid fiber spring is 400 times or more higher than that of multi-walled carbon nanotube (MWNT) fibers. Taking into consideration the difference in shape. this means that the hybrid fiber of the present invention has an about 60-fold higher shear modulus of elasticity than previously reported carbon nanotube (CNT) fibers.

The hybrid polymer composite fiber of the present invention had an electrical conductivity of 0.01-100 S/cm. and the hybrid fiber sewn on the rubber band showed a reversible change in electrical resistance during 10-20% drawing. The electrical conductivity of the self-twisted hybrid fiber (FIG. 3d) was improved by 100 times or more compared to that of the untwisted fiber and could be used without removal of the polymer to manufacture threads.

Figure 8:
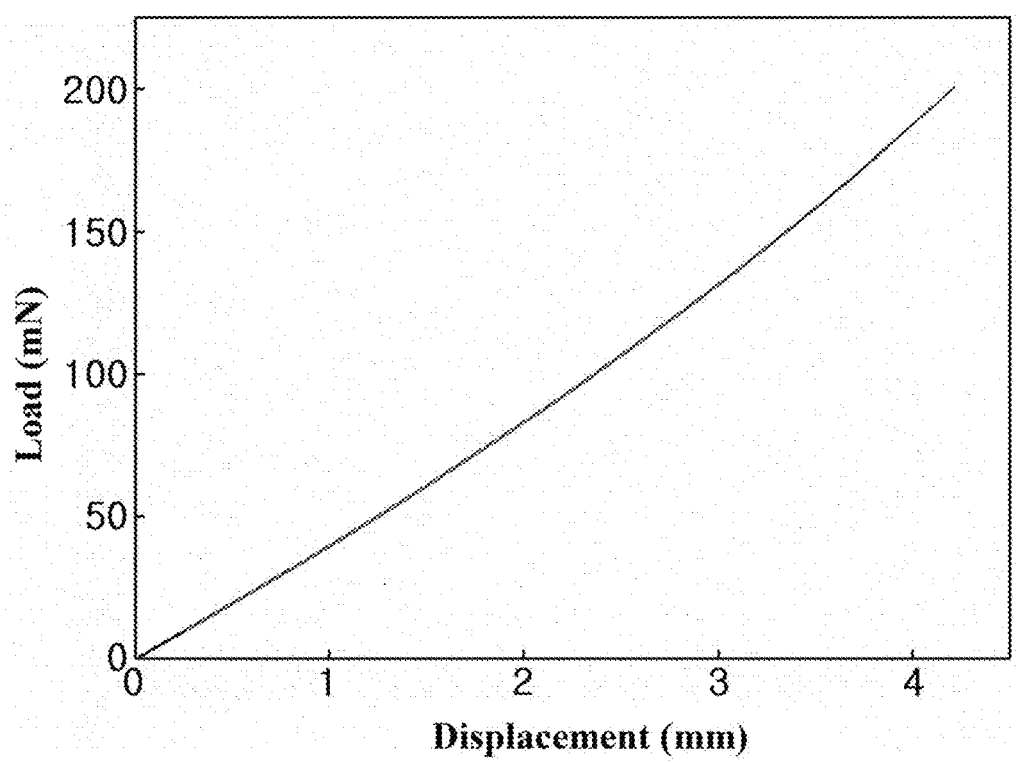
FIG. 8 is a force-displacement curve of a hybrid fiber in the form of a spring after annealing at 150° C.

The spring manufactured using the inventive hybrid fiber showed a 400 times or more higher spring constant than carbon nanotube threads manufactured from multi-walled carbon nanotube (MWNT) forests. The shear modulus of elasticity of the hybrid fiber spring increased by 60 times or more compared to that of carbon nanotube threads (FIG. 8).

The production of a composite fiber with high toughness by the hybridization of graphene flakes (GFs) and single-walled carbon nanotubes (SWNTs) is first proposed in the method of the present invention. The toughness value of the hybrid fiber of the present invention was comparable to or slightly higher than that of the single-walled carbon nanotubes/PVA (SWNT/PVA) fiber having undergone drawing.

INDUSTRIAL APPLICABILITY

As is apparent from the foregoing, the high-toughness hybrid polymer composite fiber of the present invention can be applied to high-performance artificial muscles, strain sensors, smart fibers, and wearable devices. In addition, the hybridization method based on binding interaction between different kinds of carbon nanomaterials can be used to manufacture various composite materials, including films as well as fibers.

The invention claimed is:

1. A hybrid polymer composite fiber comprising graphene and carbon nanotubes wherein the graphene and the carbon nanotubes are self-aligned through hydrogen bonding.

2. The hybrid polymer composite fiber according to claim 1, wherein the graphene are bonded to the carbon nanotubes in a weight ratio of 9:1 to 1:10.

3. The hybrid polymer composite fiber according to claim 2, wherein the graphene are bonded to the carbon nanotubes in a weight ratio of 1:1.

4. The hybrid polymer composite fiber according to claim 2, wherein the carbon nanotubes are modified with a surfactant having a hydrophilic sulfonic acid group ($SO_3^{31}$).

5. The hybrid polymer composite fiber according to claim 1, further comprising a polymer in an amount of 20 to 80% by weight.

6. The hybrid polymer composite fiber according to claim 1, wherein the graphene is chemically reduced graphene having acid functional groups on the surface thereof.

7. The hybrid polymer composite fiber according to claim 6, wherein the acid functional groups are carboxyl groups (—COOH).

8. The hybrid polymer composite fiber according to claim 1, wherein the graphene is 100 to 1000 nm in length.

9. The hybrid polymer composite fiber according to claim 1, wherein the carbon nanotubes are single-walled carbon nanotubes or multi-walled carbon nanotubes.

10. The hybrid polymer composite fiber according to claim 1, wherein the surfactant is selected from sodium dodecyl benzene sulfonate (SDBS), sodium dodecyl sulfonate (SDS), 4-(1,1,3,3-Tetramethylbutyl)phenyl-polyethylene glycol (Triton X-1001), and cetyltrimethylammonium bromide (CTAB).

11. The hybrid polymer composite fiber according to claim 1, wherein the hydrogen bonds are formed between carboxyl groups (—COOH) of the graphene and a sulfonic acid group ($SO_3^{31}$) of a surfactant bonded to the carbon nanotubes.

12. The hybrid polymer composite fiber according to claim 1, wherein the polymer is selected from polyvinyl alcohol (PVA) and poly(methyl methacrylate).

13. The hybrid polymer composite fiber according to claim 1, wherein the hybrid polymer composite fiber is flexible.

14. The hybrid polymer composite fiber according to claim 1, wherein the hybrid polymer composite fiber is capable of being formed into knot, self-twisted, rubber band or spiral spring structures.

15. The hybrid polymer composite fiber according to claim 1, wherein the hybrid polymer composite fiber has a toughness of 480 to 970 J/g.

16. The hybrid polymer composite fiber according to claim 1, wherein the hybrid polymer composite fiber has a spring constant of 10 to 100 N/m.

17. The hybrid polymer composite fiber according to claim 1, wherein the hybrid polymer composite fiber has an electrical conductivity of 0.01 to 100 S/cm.

18. A method for producing a hybrid polymer composite fiber, the method comprising
    a) dispersing chemically reduced graphene and a surfactant in a solvent to prepare a dispersion,
    b) adding a dispersion of carbon nanotubes to the dispersion of the graphene and the surfactant, and
    c) feeding a polymer to the mixed dispersion to produce a fiber.

19. The method according to claim 18, wherein the chemically reduced graphene has acid functional groups.

20. The method according to claim 18, wherein the chemically reduced graphene is prepared by reducing an aqueous dispersion of graphene with hydrazine at 90 to 100° C. for 1 to 24 hours.

21. The method according to claim 18, wherein the surfactant is selected from sodium dodecyl benzene sulfonate (SDBS), sodium dodecyl sulfonate (SDS), 4-(1,1,3,3-Tetramethylbutyl)phenyl-polyethylene glycol, and cetyltrimethylammonium bromide (CTAB).

22. The method according to claim 18, further comprising washing and drying the fiber obtained in c), followed by dipping in alcohol to improve the degree of crystallization of the fiber.

* * * * *